(12) United States Patent
Stenger et al.

(10) Patent No.: US 6,590,029 B1
(45) Date of Patent: Jul. 8, 2003

(54) WATER-DILUTABLE COATING

(75) Inventors: Michael Stenger, Telgte (DE); Sabine Molke, Ahlen (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/936,533

(22) PCT Filed: Mar. 3, 2000

(86) PCT No.: PCT/EP00/01842

§ 371 (c)(1),
(2), (4) Date: Oct. 9, 2001

(87) PCT Pub. No.: WO00/58413

PCT Pub. Date: Oct. 5, 2000

(30) Foreign Application Priority Data

Mar. 27, 1999 (DE) .......................................... 199 14 055

(51) Int. Cl.$^7$ .............................. C08J 3/00; C08K 3/20; C08L 75/00; B05D 3/02; B32B 27/00
(52) U.S. Cl. ................. 524/591; 427/372.2; 427/385.5; 428/423.1; 524/839; 524/840
(58) Field of Search ................................. 524/591, 839, 524/840; 427/372.2, 385.5; 428/423.1

(56) References Cited

U.S. PATENT DOCUMENTS

| 3,290,350 A | 12/1966 | Hoover ....................... 260/453 |
|---|---|---|
| 4,130,577 A | 12/1978 | Nagato et al. ............... 260/453 |
| 4,439,616 A | 3/1984 | Singh et al. .................... 560/25 |
| 4,489,135 A | 12/1984 | Drexler et al. ........... 428/423.1 |
| 4,558,090 A | 12/1985 | Drexler et al. .............. 524/591 |
| 4,914,148 A | 4/1990 | Hille et al. .................. 524/507 |
| 5,210,154 A | 5/1993 | Weidemeier al. ........ 525/438 |
| 5,368,944 A | 11/1994 | Hartung et al. .......... 428/423.1 |
| 5,370,910 A | 12/1994 | Hille et al. ............... 427/407.1 |
| 5,512,322 A | 4/1996 | Hille et al. ............... 427/407.1 |
| 5,569,707 A | 10/1996 | Blum et al. .................. 524/591 |
| 5,589,228 A | 12/1996 | Wegner et al. ........... 427/407.1 |
| 5,880,209 A | * 3/1999 | Patzschke et al. |

FOREIGN PATENT DOCUMENTS

| DE | 35 45 618 A1 | 6/1987 | ............ C09D/3/72 |
|---|---|---|---|
| DE | 38 13 866 A1 | 11/1989 | ............ C09D/3/72 |
| DE | 40 05 961 A1 | 8/1991 | ............ B05D/7/16 |
| EP | 0 101 832 A1 | 7/1982 | ....... C07C/125/073 |
| EP | 0 355 433 A2 | 7/1988 | ........... C08G/18/08 |
| EP | 0 438 090 A1 | 1/1990 | ......... C09D/175/06 |
| EP | WO 92/15405 | 9/1992 | ............ B05D/5/06 |
| EP | 0 669 352 A1 | 2/1994 | ........... C08G/18/66 |

* cited by examiner

*Primary Examiner*—Patrick D. Niland

(57) ABSTRACT

The invention relates to a water-dilutable coating containing polyester, polyurethane, amino resins and other usual paint additives and auxiliary agents. The polyurethane that is used is a mixture consisting of several, preferably two different polyurethane compounds (A, B) which preferably have a molecular weight of 1000 to 30000, preferably have an acid value of 5–20 mg KOH/g and can preferably be produced by reacting prepolymers containing isocyanate groups.

15 Claims, No Drawings

WATER-DILUTABLE COATING

The present invention relates to a water-dilutable coating composition that is particularly suitable for the coating of metals and plastics.

In the context of the painting of automobile bodies in particular it is nowadays necessary to carry out coating operations with a very wide variety of coatings. For example, automobiles that are provided with metallic paints are given a further coat of clearcoat material. On the other hand, nonmetallic paints must also be applied in the paint shops. For economic reasons, the clearcoat materials applied to the metallic paints, and the single-coat nonmetallic paints, are nowadays applied to the bodies in the same plants. This leads continually to painting defects, such as color entrainment from the colored single-coat paint into a clearcoat batch.

Nowadays, parts made of plastic are increasingly being used in automotive construction. Consequently, there is a desire on the part of the customer to paint these plastic parts as well. The coating materials at present on the market are incapable of coating metal and plastic equally without loss of quality.

Accordingly it is an object of the present invention to provide a water-dilutable coating composition comprising polyester, polyurethane, amino resins and further customary coatings additives and auxiliaries, the use of said composition preventing the painting defects which have occurred to date on the painting lines, and said composition being equally suitable, moreover, for the coating of metal parts and plastic parts.

This object is achieved by the polyurethane used being a mixture consisting of two or more, preferably two different, polyurethane compounds, (A, B) which preferably have a molecular weight of from 1000 to 30000 and preferably an acid number of from 5 to 20 mg KOH/g and are preferably preparable by reacting prepolymers containing isocyanate groups.

As binders it is preferred to use water-dilutable or water-dispersible amino resins, polyester resins and polyurethane resins which can be prepared in organic solution, and mixtures thereof.

The polyurethane resins used as binders in the base paints are known in principle. Examples of suitable polyurethane resins are those described in the literature for use in water-based coating materials, provided these polyurethane resins—in modification of the preparation described in the respective literature—are preparable in the form of organic solutions.

Examples of suitable polyurethane resins are the resins described in the following documents:
EP-A-355433, DE-A-3545618, DE-A 3813866 and DE-A 4005961.8

For further details of the preparation of the polyurethane resins and examples of suitable compounds, therefore, refer to these documents. Unlike the polyurethane resins described in these documents, however, the polyurethane resins are employed not as an aqueous dispersion but rather as solutions in one or more organic solvents. This means that the preparation process of the polyurethane resins used in accordance with the invention has been modified in relation to the processes described in these documents in so far as, instead of the preparation of a secondary dispersion, the polyurethane resins are dissolved in organic solvents.

It is preferred to use water-dilutable polyurethane resins which have a number-average molecular weight (determined by gel permeation chromatography using polystyrene as standard) of from 1000 to 30000, preferably of from 1500 to 20000, and an acid number of from 5 to 70 mg KOH/g, preferably of from 10 to 30 mg KOH/g, and are preparable by reaction, preferably chain extension, of prepolymers containing isocyanate groups.

The isocyanato-containing prepolymer may be prepared by reacting polyols having a hydroxyl number of from 10 to 1800, preferably of from 50 to 1200 mg KOH/g with excess polyisocyanates at temperatures of up to 150° C., preferably from 50 to 130° C., in organic solvents which are not able to react with isocyanates. The equivalents ratio of NCO groups to OH groups is between 2.0:1.0 and >1.0:1.0, preferably between 1.4:1 and 1.1:1.

The polyols used to prepare the prepolymer may be of low molecular mass and/or high molecular mass and they may contain anionic groups which are slow to react. In order to increase the hardness of the polyurethane, it is possible to use low molecular weight polyols. They have a molecular weight of from 60 up to about 400, and may contain aliphatic, alicyclic or aromatic groups. Amounts used in this context are up to 30% by weight of the total polyol constituents, preferably from about 2 to 20% by weight.

In order to obtain NCO prepolymer of high flexibility, a high proportion of a predominantly linear polyol having a preferred OH number of from 30 to 150 mg KOH/g should be added. Up to 97% by weight of the total polyol may consist of saturated and unsaturated polyesters and/or polyethers having a molar mass Mn of from 400 to 5000. The polyetherdiols selected should not introduce excessive amounts of ether groups, since otherwise the polymers formed undergo incipient swelling in water. Polyesterdiols are prepared by esterifying organic dicarboxylic acids or their anhydrides with organic diols, or are derived from a hydroxycarboxylic acid or a lactone. In order to prepare branched polyester polyols, it is possible to use, to a small extent, polyols or polycarboxylic acids having a higher functionality.

Typical polyfunctional isocyanates used are aliphatic, cycloaliphatic and/or aromatic polyisocyanates having at least two isocyanate groups per molecule. The isomers or isomer mixtures of organic diisocyanates are preferred. Owing to their good resistance to ultraviolet light, (cyclo) aliphatic diisocyanates give rise to products having little tendency to yellow.

The polyisocyanate component used to form the prepolymer may also contain a fraction of polyisocyanates of higher functionality, provided that this does not cause any gelling. Products which have proven suitable as triisocyanates are those formed by trimerization or oligomerization of diisocyanates or by reaction of diisocyanates with polyfunctional compounds containing OH or NH groups. The average functionality may be lowered, where appropriate, by adding monoiso-cyanates.

In accordance with the invention, mixtures of 2 or more different polyurethanes are used. Preferably, the mixture consists of 2 components, A and B. These are preferably added to the coating composition of the invention in a ratio of from 3:1 to 1:3, with very particular preference from 2:1 to 1:2.

To prepare the polyurethane resin solution A, use is made in particular of diisocyanates of the general formula (I)

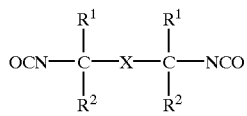

where X is a divalent, aromatic hydrocarbon radical, preferably an insubstituted or halogen-, methyl-, or methoxy-substituted naphthylene, biphenylene or 1,2-, 1,3- or 1,4-phenylene radical, with particular preference a 1,3-phenylene radical, and $R^1$ and $R^2$ are an alkyl radical having from 1 to 4 carbon atoms, with particular preference a methyl radical. Diisocyanates of formula (I) are known (their preparation is described for example, in EP-A-101 832, U.S. Pat. Nos. 3,290,350, 4,130,577 and 4,439,616) and in part are available commercially (1,3-bis(2-isocyanatoprop-2-yl)benzene, for example, is sold by the American Cyanamid Company under the trade name TMXDI (META)$^R$).

For the preparation of the other polyurethane component B, other aliphatic and/or cycloaliphatic and/or aromatic polyisocyanates are used instead of the diisocyanates of formula (I). Examples of polyisocyanates which may be used in addition are phenylene diisocyanate, tolylene diisocyanate, xylylene diisocyanate, bisphenylene diisocyanate, naphthylene diisocyanate, diphenylmethane diisocyanate, isophorone diisocyanate, cyclopentylene diisocyanate, cyclohexylene diisocyanate, methylcyclohexylene diisocyanate, dicyclohexylmethane diisocyanate, trimethylene diisocyanate, tetramethylene diisocyanate, pentamethylene diisocyanate, hexamethylene diisocyanate, propylene diisocyanate, ethylethylene diisocyanate, and trimethylhexane diisocyanate.

The use of isophorone diisocyanate and hexamethylene diisocyanate is very particularly preferred. The latter is available commercially under the designation HMDI-DESMODUR (brand name of Bayer AG).

Polyurethanes are generally not compatible with water unless specific constituents are incorporated during their synthesis and/or particular preparation steps are undertaken. Thus, in order to prepare the polyurethane resins, it is possible to use compounds containing two H-active groups which are reactive with isocyanate groups, and at least one group which ensures dispersibility in water (carrier groups). Suitable carrier groups are nonionic groups (e.g., polyethers), anionic groups, mixtures of these two groups, or cationic groups.

Accordingly it is possible to install in the polyurethane resin an acid number sufficient to allow the neutralized product to be stably dispersed in water. Useful for this purpose are compounds which contain two isocyanate-reactive H-active groups and at least one group capable of forming anions. Suitable isocyanate-reactive groups are, in particular, hydroxyl groups and also primary and/or secondary amino groups. Groups capable of forming anions are carboxyl, sulfonic acid and/or phosphonic acid groups. It is preferred to use carboxylic acid or carboxylate groups. They should be sufficiently slow to react that the isocyanate groups of the diisocyanate react preferably with the other isocyanate-reactive groups of the molecule. For this purpose use is made of alkanoic acids having two substituents on the α carbon atom. The substituent may be a hydroxyl group, an alkyl group or an alkylol group. These polyols have at least one, generally from 1 to 3, carboxyl groups in the molecule. They have from two to about 25, preferably from 3 to 10, carbon atoms. The polyol contained carboxyl groups may make up from 3 to 100% by weight, preferably from 5 to 50% by weight, of the total polyol constituent in the NCO prepolymer.

The amount of ionizable carboxyl groups that is available in salt form as a result of the neutralization of the carboxyl groups is generally at least 0.4% by weight, preferably at least 0.7% by weight, based on the solids. The upper limit is about 6% by weight. The amount of dihydroxyalkanoic acids in the non-neutralized prepolymer produces an acid number of at least 5, preferably at least 10. At very low acid numbers, further measures are generally necessary in order to achieve dispersibility in water. The upper limit of the acid number is 70, preferably 40 mg KOH/g, based on the solids.

The NCO prepolymers used in accordance with the invention may be prepared by simultaneous reaction of the polyol or polyol mixture with a diisocyanate excess. Alternatively, the reaction may also be performed in stages in the prescribed sequence. Examples are described in DE-A 26 24 442 and DE-A 32 10 051. The reaction temperature is up to 150° C., preference being given to a temperature in the range from 50 to 130° C.

The reaction is continued until virtually all of the hydroxyl functions have reacted. The NCO prepolymer contains at least about 0.5% by weight of isocyanate groups, preferably at least 1% by weight NCO, based on solids. The upper limit is about 15% by weight, preferably 10% by weight, with particular preference 5% by weight.

The reaction may where appropriate be conducted in the presence of a catalyst, such as organotin compounds and/or tertiary amines. In order to keep the reactants in the liquid state and to allow better temperature monitoring during the reaction, it is possible to add organic solvents which contain no Zerevitinov active hydrogen. The amount of solvent may vary within wide limits and should be sufficient for the formation of a prepolymer solution of appropriate viscosity. In general from 10 to 70% by weight of solvent, preferably from 20 to 50% by weight of solvent, based on solids, is used.

The remaining isocyanate groups of the prepolymer are reacted with a modifier. This reaction leads in particular to a further linking and increase in the molecular weight. The amount of this modifier is determined by its functionality and by the NCO content of the prepolymer. The equivalents ratio of the active hydrogen atoms in the modifier to the NCO groups in the prepolymer should generally be less than 3:1 and should preferably be situated in the range between 1:1 and 2:1.

Preferred modifiers used for the reaction with the prepolymer are diols, with particular preference triols and/or polyols.

It is also possible, however, to use other compounds containing active hydrogen atoms as modifiers, examples being polyamines, albeit only subject to the proviso that the reaction of the prepolymer with the modifier can be carried out (can be controlled) in an organic solvent and that this reaction is not accompanied by any unwanted reactions, such as, for example, the gelling at the point of dropwise addition of the amine, which is frequently observed when polyamines are used.

Examples that may be mentioned of polyols contained at least three hydroxyl groups are trimethylolpropane, glycerol, erythritol, mesoerythritol, arabitol, adonitol, etc. Preference is given to using trimethylolpropane. The reaction of the prepolymer with the triols and/or polyols is preferably controlled by means of the stoichiometry of the compounds used in such a way that chain extension occurs.

Additionally, water-dilutable or water-dispersible polyester resins which can be prepared in the form of organic solutions are added to the coating composition of the invention. Use is made, for example, of corresponding, commercially customary, water-dilutable or water-dispersible polyester resins and of polyester resins which are commonly used in water-based coating materials.

Furthermore, the coating composition of the invention also includes water-dilutable and/or water-dispersible amino resins. It is preferred to use water-dilutable melamine resins. These are generally etherified melamine-formaldehyde condensation products. Apart from the degree of condensation, which should be as low as possible, the solubility of the amino resins in water depends on the etherifying component, with only the lowest members of the alcohols or ethylene glycol monoether series producing water-soluble condensates. The greatest significance is possessed by the methanol-etherified melamine resins. Examples of melamine resins which can be used in accordance with the invention are Cymel 327 from Cytec and Luvipal 072 from BASF AG. When solubilizers are used, it is also possible to disperse butanol-etherified melamine resins in the aqueous phase. A further possibility is to insert carboxyl groups into the condensate. Transetherification products of highly etherified formaldehyde condensates with oxycarboxylic acids are water-soluble following neutralization by way of its carboxyl groups and may be present in the base paints. As binders it is of course also possible to use mixtures of the aforementioned binders and also, additionally, other water-dilutable or water-dispersible binders.

With preference, the coating composition of the invention comprises, as binders, water-dilutable polyurethane resins or water-dilutable amino resins or mixtures of water-dilutable polyurethane resins and amino resins.

The ratio of the polyester to the polyurethane is preferably from 7:3 to 9:1.

The ratio of the mixture of polyurethane and polyester to amino resin is preferably between 7:3 and 9:1.

As solvents, the coating composition comprises one or more organic solvents. Examples of suitable solvents are, in particular, water-soluble or water-dilutable solvents, such as alcohols, esters, ketones, keto esters, glycol ether esters and the like, for example. Preference is given to using alcohols and glycol ethers, with particular preference to butyl glycol and butanols.

The possibility exists here, during the preparation of the binders themselves, of using solvents which also remain as solvents later in the base paint. More frequently, however, the binders are prepared using a different solvent, which following the preparation of the binders is gently distilled off by vacuum distillation or thin-film evaporation and is replaced by a solvent which remains in the binder solution that is then used in the base paint. Higher-boiling solvents should be soluble in water and remain in the polyurethane resin solution that is used in the base paint in order to facilitate the coalescence of the polymer particles during film forming.

For example, the polyurethane resin solution is prepared in a ketone, such as methyl ethyl ketone or acetone, for example. Subsequently, following addition of butyl glycol, solvent exchange takes place by distillative removal of the ketone (methyl ethyl ketone, acetone). Particularly preferred solvents for the preparation of the polyurethane resin are methoxy-propyl acetate, ethoxyethyl acetate and N-methyl-pyrroline, which need not be exchanged (no active hydrogen) and may remain in component A. Where appropriate, these solvents may also be used in a mixture with ketones for the preparation of the polyurethane resins, although the ketones do not remain in the base paint but instead are exchanged following preparation of the polyurethane resin.

The mixture may comprise any customary coating pigments, especially organic- or inorganic-based color pigments.

For the preparation of the paint of the invention it is possible to use all pigments which are commonly employed in connection with the formulation of aqueous coating compositions.

Examples of suitable inorganic-based color pigments are titanium dioxide, iron oxides, carbon black and the like. Examples of suitable organic-based color pigments are indathrene blue, Chromophthal red, Irgazine orange, Sicotrans yellow, Heliogen green and the like.

The coating composition of the invention may further comprise customary auxiliaries and additives. Examples of additives of this kind are defoamers, dispersing aids, emulsifiers, leveling agents, etc.

The coating composition of the invention is prepared in accordance with methods known to the skilled worker, by mixing and, where appropriate, dispersing the individual components. The individual polyurethane compounds may first of all be mixed with one another and only then mixed with the polyester, amino resin, and further additives and auxiliaries. In accordance with the invention, however, it is also possible to mix the polyurethane compounds in succession with the other substances.

The incorporation of color pigments usually by grinding (dispersing) of the respective pigments with one or more of the above-described binders, which are preferably used in the form of their solutions in organic solvents. If desired, further organic solvents may be added for dispersing. The dispersing of these pigments takes place with the aid of customary equipment, such as bead mills and sand mills, for example.

The effect pigments are normally incorporated by homogeneously mixing the effect pigments with one or more solvents. This mixture is then incorporated into a mixture of one or more of the above-described binders, where appropriate with addition of further organic solvents, by means of a stirrer or dissolver. The binders are preferably used in the form of their solutions in organic solvents.

As is familiar to the skilled worker, the respective proportions of pigment, binder, and solvent are guided by the rheology of the pigment paste and are therefore dependent on the particular pigment used.

In the text below the invention is described in more detail with reference to the examples:

I. Comparison of Coating Materials with Different Binder Contents

In order to determine the optimum binder constituents, the test matrix described in table 1 was realized. The decision basis selected comprised the critical tests laid down in the Ford Engineering Material Specification ESK-M62J34A, in accordance with the Ford Laboratory Test Method for stone-chipping BI 157-4, adhesion BI 106-1 A/BC, and water immersion test BI 104-1. The Ford Engineering Material Specification ESK-M62J34A and the Ford Laboratory Test Method is made available to every paint manufacturer.

As can be seen from the results listed in table 1, the formulations based on the grafted acrylate exhibit the poorest results. Owing to the adhesion and the blister pattern in the water immersion test, this binder base is unsuitable.

Better technological values are achieved in the case of formulations of polyurethane that has been obtained by reactions of methatetramethylxylene diisocyanate (TMXDI-PUR). In this case the influence of different melamine resins is negligible except for the variant with catalyzed Cymel 303.

A further significant improvement with respect to the stonechip test is achieved, surprisingly, through the use of a polyurethane blend. The blends tested in this case were of TMXDI-PUR on the one hand with a polyurethane obtained by reaction with isophorone diisocyanate (IPDI-PUR) and on the other hand with a polyurethane obtained by reaction with hexanemethylene diisocyanate (DESMODUR-W-PUR).

II. Testing for Suitability for Painting Plastics

For testing of the specification ESK-M62J30A2 for painting plastics, the materials according to table 3 were used. The test results show that the inventive formulations 10 and 12 have distinct advantages, in all test points, over the plastics systems 11 and 13.

TABLE 1

| Formulation | 1 | 2 | 3 | 4 | 5 | 6 | 7 | 8 | 9 | Binder |
|---|---|---|---|---|---|---|---|---|---|---|
| A | 24.4 | 24.4 | — | — | — | — | — | — | — | TMXDI-PUR |
| B | 8.8 | 8.8 | — | — | — | — | — | — | — | TMXDI-PUR |
| C | 7.1 | 7.1 | — | — | — | — | — | — | — | TMXDI-PUR |
| D | 1.2 | 1.2 | — | — | — | — | — | — | — | TMXDI-PUR |
| E | — | — | 35.6 | 35.6 | 35.6 | 35.6 | 35.6 | 35.6 | 35.6 | Polyester direct dispersion* |
| F | — | — | 15.1 | 15.1 | 15.1 | 15.15 | 15.1 | 15.1 | 15.1 | Polyester |
| G | — | — | 15.2 | 15.2 | 15.2 | 11.0 | 11.0 | 11.0 | 11.0 | TMXDI-PUR |
| H | — | — | — | — | — | 4.8 | 4.8 | — | — | IPDI-PUR |
| I | — | — | — | — | — | — | — | 4.3 | 4.3 | Desmodur-W PUR |
| K | 26.8 | 26.8 | — | — | — | — | — | — | — | Grafted acrylate (Ac) |
| Cymel 327 | 6.5 | — | 6.5 | — | — | 6.5 | — | 6.5 | — | |
| Luvipal 072 | — | 7.9 | — | 7.9 | — | — | 7.9 | — | 7.9 | |
| Cymel 303 | — | — | — | — | 6.0 | — | — | — | — | |
| Q | — | — | — | — | 0.6 | — | — | — | — | |
| 2-Ethylhexanol | 2.5 | 2.5 | 2.5 | 2.5 | 2.5 | 2.5 | 2.5 | 2.5 | 2.5 | |
| Dimethyl-ethanolamine 10% in water | 1.0 | 1.0 | 1.0 | 1.0 | 1.0 | 1.0 | 1.0 | 1.0 | 1.0 | |
| DI water | 5.0 | 5.0 | 5.0 | 5.0 | 5.0 | 5.0 | 5.0 | 5.0 | 5.0 | |
| Mixing ratio | | | | | | | | | | The polyester direct |
| Ac:PUR | 1:1 | 1:1 | | | | | | | | dispersion was used, since |
| Ac + PUR:Me | 8:2 | 8:2 | | | | | | | | owing to the PUR content of |
| PE:PUR | | | 8:2 | 8:2 | 8:2 | 8:2 | 8:2 | 8:2 | 8:2 | the |
| PE + PUR:Me | | | 8:2 | 8:2 | 8:2 | 8:2 | 8:2 | 8:2 | 8:2 | pastes the PE-PUR mixing |
| PUR ratio | | | | | | 3:1 | 3:1 | 3:1 | 3:1 | ratio could not be realized |
| Test constructions | EC: | | | | | | | | | |
| Test constructions | Primer | 165° C. | | | | | | | | |
| | WBP: | 80° C. | | | | | | | | |
| | CC: | 130° C. | | | | | | | | |
| Result: | | | | | | | | | | |
| Stonechip test: EU-BI 167-4- | (2kg 2 | bar, 7 2 h | WET T, | 2kg 2 | bar) | Target value | 1xDL | max.3 | 2xDL | max.4 |
| 1 x DL | 2 | 2 | 2–3 | 2–3 | 2 | 2*–3 | 2*–3 | 2–3 | 2–3 | |
| 2 x DL | 4 | 3–4 | 3 | 3 | 3 | 2*–3 | 2*–3 | 3 | 3 | |
| *clear tendency toward 2 | | | | | | | | | | |
| Water immersion test: EU-BI 104-1 | (240 h | WET T | 32° C.) | Target value | Satis. | | | | | |
| 1 x DL | Blisters m1g1 | Blisters m1g1 | Satis. | Satis. | Satis. | Satis. | Satis. | Satis. | Satis. | |
| 2 x DL | Incipiently swollen | Satis. | Satis. | Satis. | Satis. | Satis. | Satis. | Satis. | Satis. | |
| **slightly inciprently swollen | | | | | | | | | | |
| Adhesion test: EU-BI 106-1C | (St. Andrew's cross) | | after | WET 240 h | Target T | value | Satis. | | | |
| 1 x DL | Satis. | Satis. | Satis. | Satis. | Satis. | Satis. | Satis. - Satis. | Satis. | Satis. | |
| 2 x DL | Satis. | Satis. | Satis. | Satis. | Satis. | Satis. | Satis. | Satis. | Satis. | |

TABLE 2

| Plastics testing | 10 | 11 | 12 | 13 | |
|---|---|---|---|---|---|
| I | | 46.0 | | 36.0 | Desmodur W-PUR |
| F | 6.4 | 14.0 | 2.4 | 10.0 | Polyester |
| G | 10.1 | | 7.7 | | TMXDI-PUR |

TABLE 2-continued

| | | | | | |
|---|---|---|---|---|---|
| H | 4.4 | | 3.5 | | IPDI-PUR |
| Cymel 327 | 6.0 | 2.8 | 4.6 | 2.0 | |
| R | | | 2.0 | 1.6 | Aerosil R972 |
| L | 9.0 | | 0.9 | | Aerosil paste |
| M | 14.1 | | 8.8 | | Siloid paste |
| N | | 6.0 | | 6.0 | Bentone paste |
| O | 1.1 | | 1.0 | | |
| P | 2.2 | | 2.0 | | |
| Wetting agent | | 1.5 | | 1 | Disperbyk 182 from BYK |
| E | 41.4 | 8 | | 8 | Polyester direct dispersion |
| S | | | 64.4 | | |
| Irgazine DPP red BO | | 2.8 | | | |
| Novoperm red P2RK7 | | 5.6 | | | |
| Quindo Magenta RV | | 1.9 | | | |
| Titanium rutile 2310 | | 0.7 | | 33.0 | |
| Dimethylethanolamine 10% in water | 1.0 | 1.0 | 1.2 | 0.8 | |
| 2-Ethylhexanol | 2.5 | | 2.0 | | |
| Isopropanol | 1.8 | | 1.5 | | |
| n-Methylpyrolidone | | 3.0 | | 1.0 | |
| DI water | | 12.7 | | 8.6 | |

| Test systems: | Substrate | Plastic (polycarbonate | | FYP |
|---|---|---|---|---|
| | WBP: 10 | 3 min 90° C. | | |
| | 11 | 3 min 90° C. | | |
| | 12 | 3 min 90° C. | | |
| | 13 | 3 min 90° C. | | |
| | CC: | 25 min 90° C. object | Plastics spec. | Clearcoat mat. |

| Result | | H | | |
|---|---|---|---|---|
| Adhesion test: EU-BI106-1C (St. Andrew's cross) | For 240 | WET T | Target value | Satis. |
| *Delamination down to the substrate | Satis. | Unsatis.* | Satis. | Unsatis.* |
| Adhesion test EU-BI 106-1C St. Andrew's cross | After 24 | 0 h WET | T Target | Value: Satis. |
| *Delamination down to the substrate | Satis. | Unsatis.* | Satis. | Satis.* |
| Water immersion test: EU-BI 104-1 (240 h | WET T | 32° C.) | Target value | Satis. |
| *Slight swelling, regenerated after 24 h storage RT<br>**Severe swelling, regenerated after 24 h storage RT | Satis.* | Blisters m1g5** | Satis. | Blisters m2g2** |
| Steamjet test: target value satis. | Satis. | Satis. | Satis. | Unsatis.* |

*Delamination down to the substrate

The formulations 6, 7, 8, 9, 10 and 12 are the inventive coatings. In contrast, the formulations 1 to 5 and also 11 and 13 are the comparisons in accordance with the prior art.

The breakdown of the compositions A–S used may be taken from the following:

| A. | 74.6 | PARODUR EL 66.6 | | TMXDI-PUR |
|---|---|---|---|---|
| | 2.0 | PLURIOL P 900 | | Wetting agent |

| B. | 66.4 | PARODUR EL 66.6 | TMXDI-PUR |
|---|---|---|---|
| | 28.4 | IRGAZINE DPP-RED BO | Pyrrolopyrrole |
| | 20.5 | NOVOPERM-RED F2RK70 | Naphthol red |
| | 1.0 | NEUTR.LSG.F.WATER-BC | Dimethyl-ethanolamine 10% in DI water |
| | 1.6 | WATER, DI | |

-continued

|   |   |   |   |
|---|---|---|---|
|   | 1.1 | NEUTR.LSG.F. WATER-BC | Dimethyl-ethanolamine 10% in DI water |
|   | 4.1 | WATER, DI |   |
| C. | 45.2 | PARODUR EL 66.6 | TMXDI-PUR |
|   | 2.6 | PLURIOL P 900 | Wetting agent |
|   | 6.3 | BUTYL DIGLYCOL |   |
|   | 9.6 | WATER, DI |   |
|   | 24.0 | HOSTAPERM-PINK E | Quinacridone red |
|   | 12.0 | WATER, DI |   |
|   | 0.3 | NEUTR.LSG.F.WATER-BC | Dimethyl-ethanolamine 10% in DI water |
| D. | 44.2 | PARODUR EL 66.6 | TMXDI-PUR |
|   | 0.6 | AEROSIL R 972 | Silica |
|   | 0.5 | NEUTR.LSG.F.WATER-BC | Dimethyl-ethanolamine 10% in DI water |
|   | 54.5 | TITANIUM RUTILE 2310 | Titanium dioxide |
| E. | 36.1 | PAROTAL EF 83.6 | Polyester |
|   | 1.4 | PLURIOL P 900 | Wetting agent |
|   | 1.4 | NEUTR.LSG.F.WATER7BC | Dimethyl-ethanolamine 10% in DI water |
|   | 30.0 | WATER, DI |   |
|   | 11.1 | NOVOPERM-RED F 2 RK 70 | Naphthol red |
|   | 5.5 | IRGAZINE DPP RED BO | Pyrrolopyrrole |
|   | 3.8 | HOSTAPERM-PINK E | Quinacridone red |
|   | 1.4 | TITANIUM RUTILE 2310 | Titanium dioxide |
|   | 9.3 | WATER, DI |   |
| F. | 26.32 | PRIPOL 1009 |   |
|   | 10.63 | 1,6-HEXANEDIOL |   |
|   | 7.48 | ISOPHTHALIC ACID 99% |   |
|   | 9.38 | NEOPENTYL GLYCOL |   |
|   | 0.70 | CYCLOHEXANE |   |
|   | 7.41 | TRIMELLITIC ANHYDRIDE |   |
|   | 14.50 | WATER, DI |   |
|   | 5.00 | BUTYL DIGLYCOL |   |
|   | 2.40 | DIMETHYLETHANOLAMINE |   |
|   | 14.00 | BUTYL DIGLYCOL |   |
|   | 0.20 | DIMETHYLETHANOLAMINE |   |
|   | 1.98 | WATER, DI |   |
| G. | 24.882 | PAROTAL EF 03.0 |   |
|   | 0.264 | NEOPENTYL GLYCOL |   |
|   | 1.527 | DIMETHYLOLPROPIONIC ACID |   |
|   | 7.707 | TMXDI | Methatetra-methylxylene diisocyanate |
|   | 1.316 | TRIMETHYLOLPROPANE, 100% |   |
|   | 5.384 | BUTYL GLYCOL |   |
|   | 1.000 | BUTYL GLYCOL |   |
|   | 0.841 | DIMETHYLETHANOLAMINE |   |
|   | 55.000 | WATER, DI |   |
|   | 2.079 | WATER, DI |   |
| H. | 20.092 | PAROTAL EF 98.3 |   |
|   | 0.196 | NEOPENTYL GLYCOL |   |
|   | 1.197 | DIMETHYLOLPROPIONIC ACID |   |
|   | 5.495 | ISOPHORONE DIISOCYANATE IPDI |   |
|   | 5.387 | METHYL ETHYL KETONE |   |
|   | 0.504 | TRIMETHYLOLPROPANE, 100% |   |
|   | 3.123 | BUTYL GLYCOL |   |
|   | 0.602 | DIMETHYLETHANOLAMINE |   |
|   | 59.000 | WATER, DI |   |
|   | 2.000 | BUTYL GLYCOL |   |
|   | 2.404 | WATER, DI |   |
| I. | 17.921 | PAROTAL EF 98.3 | Polyester |
|   | 1.169 | DIMETHYLOLPROPIONIC ACID |   |
|   | 0.243 | NEOPENTYL GLYCOL |   |
|   | 6.309 | HMDI-DESMODUR W, 100% |   |
|   | 5.504 | METHYL ETHYL KETONE |   |
|   | 0.607 | TRIMETHYLOLPROPANE, 100% |   |
|   | 0.339 | BUTANOL |   |
|   | 0.613 | DIMETHYLETHANOLAMINE |   |
|   | 4.281 | PLURIOL P 900 |   |
|   | 0.298 | METHYL ETHYL KETONE |   |
|   | 54.367 | WATER, DI |   |
|   | 0.010 | DIMETHYLETHANOLAMINE |   |
|   | 8.339 | WATER, DI |   |

-continued

|   |   |   |   |
|---|---|---|---|
| L. | 30.0 | ISOPROPANOL |   |
|   | 16.5 | BUTYL GLYCOL |   |
|   | 31.0 | PAROTAL EF 83.6 | Polyester |
|   | 2.5 | NEUTR.LSG.F.WATER-BC |   |
|   | 12.0 | AEROSIL R 972 | Silica |
|   | 8.0 | WATER, DI |   |
| M. | 30.000 | PAROTAL EF 83.6 | Polyester |
|   | 11.000 | NEUTR.LSG.F.WATER-BC |   |
|   | 46.000 | BUTYL GLYCOL |   |
|   | 12.000 | SYLOID ED 3 | Silica |
|   | 1.000 | WATER, DI |   |
| N. | 70.00 | WATER, DI |   |
|   | 0.15 | MERGAL K 9N |   |
|   | 6.0 | BENTONE EW |   |
|   | 23.85 | WATER, DI |   |
| O. | 50.0 | EFKA 772 60% SEC-BUTANOL | Leveling agent |
|   | 50.0 | NEUTR.LSG.F.WATER-BC |   |
| P. | 75.0 | BUTYL DIGLYCOL |   |
|   | 25.0 | WETTING AGENT SOLUTION COL. |   |
| Q. |   | Nacure 2500 | para-toluene-sulfonic acid 25% in IPA |
| R. |   | Aerosil R 972 |   |
| S. | 24.6 | PAROTAL EF 83.6 | Polyester |
|   | 1.8 | PLURIOL P 900 | Wetting agent |
|   | 1.8 | NEUTR.LSG.F.WATER-BC | Dimethyl-ethanolamine 10% in DI water |
|   | 24.8 | WATER, DI |   |
|   | 1.3 | AEROSIL R 972 | Silica |
|   | 45.7 | TITANIUM RUTILE 2310 | Titanium dioxide |

Polyester from TMXDI-PUR
  20.310 PRIPOL 1013
  12.340 NEOPENTYL GLYCOL
  13.998 1,6-HEXANEDIOL
  26.268 ISOPHTHALIC ACID 99%
  1.100 CYCLOHEXANE
  23.272 METHYL ETHYL KETONE
  2.712 METHYL ETHYL KETONE
Polyester from IPDI-PUR
  39.487 PRIPOL 1013
  21.739 1,6-HEXANEDIOL
  11.689 ISOPHTHALIC ACID 99%
  1.100 CYCLOHEXANE
  23.272 METHYL ETHYL KETONE
  2.713 METHYL ETHYL KETONE

What is claimed is:

1. A water-dilutable coating composition comprising polyester, polyurethane, and amino resins, wherein the polyurethane comprises a mixture of at least two polyurethane compounds, wherein the polyurethane compounds comprise a reaction product of a polyester polyol that contains at least one carboxyl group, a polyol, and a polyisocyanate, wherein at least a portion of the polyol comprises a polyol that contains at least one carboxyl group, and wherein the polyurethane compounds each have a number-average molecular weight of from 1,000 to less than 20,000.

2. The water-dilutable coating composition of claim 1, wherein the polyurethane compounds each have at least one of i) a number-average molecular weight of from 1,500 to less than 20,000, ii) an acid number of from 5 to 20 mg KOH/g, and iii) comprise a reaction product of prepolymers containing isocyanate groups.

3. The water-dilutable coating composition of claim 1, wherein the polyurethanes comprise a reaction product of polyfunctional isocyanates containing at least 2 isocyanate groups per molecule.

4. The water-dilutable coating composition of claim 1, wherein the polyurethane mixture comprises at least one polyurethane compound comprising a reaction product that includes a diisocyanate of the formula (I)

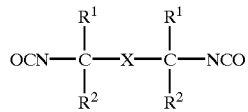

where X is a divalent, aromatic hydrocarbon radical, and $R^1$ and $R^2$ are each independently an alkyl radical having from 1 to 4 carbon atoms.

5. The water-dilutable coating composition of claim 1, wherein the resins in the polyurethane mixture consist of a first polyurethane and a second polyurethane, and a weight ratio of the first polyurethane to the second polyurethane lies between 3:1 and 1:3.

6. The water-dilutable coating composition of claim 1, wherein a weight ratio of polyester to the polyurethane mixture is between 7:3 and 9:1.

7. The water-dilutable coating composition of claim 1, wherein a weight ratio of a mixture consisting of polyester and polyurethane to amino resin is between 7:3 and 9:1.

8. The water-dilutable coating composition of claim 1 further comprising additives and fillers comprising at least one of defoamers, dispersing aids, emulsifiers, and leveling agents.

9. A process for preparing a water-dilutable coating composition comprising polyester, polyurethane, and amino resins, wherein the polyurethane comprises a mixture of at least two polyurethane compounds, comprising mixing at least two polyurethane compounds and mixing the polyurethane compounds with the polyester resin and the amino resin, wherein the polyurethane compounds comprise a reaction product of a polyester polyol that contains at least one carboxyl group, a polyol, and a polyisocyanate, wherein at least a portion of the polyol comprises a polyol that contains at least one carboxyl group, and wherein the polyurethane compounds each have a number-average molecular weight of from 1,000 to less than 20,000.

10. The process of claim 9, wherein color pigments are incorporated by dispersing the color pigments into at least one of a polyurethane compound and in the mixture of at least two polyurethane compounds.

11. A method comprising applying the water-dilutable coating composition of claim 1 to at least one of a metal and a plastic.

12. The water-dilutable coating composition of claim 1, wherein the resins consist of a mixture of the polyurethane resins, the polyester resins, and the amino resins, and the water-dilutable coating composition can be applied to a metal substrate and a plastic substrate.

13. The water-dilutable coating composition of claim 1, wherein at least two of the following:
  a. the polyurethane compounds each have at least one of i) a number-average molecular weight of from 1,500 to less than 20,000, ii) an acid number of from 5 to 20 mg KOH/g, and iii) comprise a reaction product of prepolymers containing isocyanate groups;
  b. the polyurethane comprise a reaction product of polyfunctional isocyanates containing at least 2 isocyanate groups per molecule;
  c. the polyurethane mixture comprises at least one polyurethane compound comprising a reaction product that includes a diisocyanate of the formula (I)

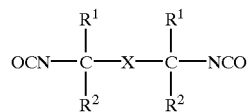

where X is a divalent, aromatic hydrocarbon radical, and $R^1$ and $R^2$ are each independently an alkyl radical having from 1 to 4 carbon atoms;
  d. the resins in the polyurethane mixture consist of a first polyurethane and a second polyurethane, and a weight ratio of the first polyurethane to the second polyurethane lies between 3:1 and 1:3;
  e. a weight ratio of polyester to the polyurethane mixture is between 7:3 and 9:1;
  f. a weight ratio of a mixture consisting of polyester and polyurethane to amino resin is between 7:3 and 9:1; and
  g. the water-dilutable coating composition further comprises additives and fillers comprising at least one of defoamers, dispersing aids, emulsifiers, and leveling agents.

14. The process of claim 9, wherein at least one of the following:
  a. the polyurethane compounds each have at least one of i) a number-average molecular weight of from 1,500 to less than 20,000, ii) an acid number of from 5 to 20 mg KOH/g, and iii) comprise a reaction product of prepolymers containing isocyanate groups;
  b. the polyurethanes comprise a reaction product of polyfunctional isocyanates containing at least 2 isocyanate groups per molecule;
  c. the polyurethane mixture comprises at least one polyurethane compound comprising a reaction product that includes a diisocyanate of the formula (I)

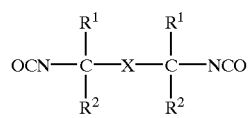

where X is a divalent, aromatic hydrocarbon radical, and $R^1$ and $R^2$ are each independently an alkyl radical having from 1 to 4 carbon atoms;
  d. the resins in the polyurethane mixture consist of a first polyurethane and a second polyurethane, and a weight ratio of the first polyurethane to the second polyurethane lies between 3:1 and 1:3;
  e. a weight ratio of polyester to the polyurethane mixture is between 7:3 and 9:1;
  f. a weight ratio of a mixture consisting of polyester and polyurethane to amino resin is between 7:3 and 9:1; and
  g. the water-dilutable coating composition further comprises additives and fillers comprising at least one of defoamers, dispersing aids, emulsifiers and leveling agents.

15. The process of claim 9, wherein the resins consist of a mixture of the polyurethane resins the polyester resins, and the amino resins, and the water-dilutable coating composition can be applied to a metal substrate and a plastic substrate.

* * * * *